(12) United States Patent
Bengtsson

(10) Patent No.: US 9,319,112 B2
(45) Date of Patent: Apr. 19, 2016

(54) METHOD OF CONTROLLING A SIGNAL TRANSMISSION IN A CELLULAR MIMO SYSTEM, BASE STATION, AND CELLULAR MIMO SYSTEM

(71) Applicant: Sony Corporation, Tokyo (JP)

(72) Inventor: Erik Bengtsson, Eslöv (SE)

(73) Assignee: Sony Corporation, Tokyo (JP)

( * ) Notice: Subject to any disclaimer, the term of this patent is extended or adjusted under 35 U.S.C. 154(b) by 43 days.

(21) Appl. No.: 14/288,475

(22) Filed: May 28, 2014

(65) Prior Publication Data
US 2015/0349856 A1     Dec. 3, 2015

(51) Int. Cl.
| H04B 7/04 | (2006.01) |
| H04W 24/08 | (2009.01) |
| H04W 72/08 | (2009.01) |
| H04B 7/06 | (2006.01) |
| H04L 5/00 | (2006.01) |
| H04L 25/02 | (2006.01) |

(52) U.S. Cl.
CPC ............ *H04B 7/0413* (2013.01); *H04B 7/0408* (2013.01); *H04B 7/0452* (2013.01); *H04B 7/0689* (2013.01); *H04L 5/0023* (2013.01); *H04W 24/08* (2013.01); *H04W 72/085* (2013.01); *H04L 25/0204* (2013.01)

(58) Field of Classification Search
None
See application file for complete search history.

(56) References Cited

U.S. PATENT DOCUMENTS

| 2011/0007685 | A1* | 1/2011 | Ma | H01Q 25/00 370/315 |
| 2011/0249637 | A1* | 10/2011 | Hammarwall | H04B 7/0634 370/329 |
| 2013/0034000 | A1* | 2/2013 | Huo | H04L 25/03343 370/252 |
| 2013/0229941 | A1* | 9/2013 | Huang | H04B 7/0452 370/252 |
| 2013/0279425 | A1 | 10/2013 | Balraj et al. | |
| 2013/0322280 | A1* | 12/2013 | Pi | H04W 72/0413 370/252 |
| 2014/0376653 | A1* | 12/2014 | Xu | H04B 7/0456 375/267 |

FOREIGN PATENT DOCUMENTS

| WO | 2008081453 A1 | 7/2008 |
| WO | 2012065278 A1 | 5/2012 |

OTHER PUBLICATIONS

Catt: "Multiple Antenna Technology for E-UTRA," 3GPP Draft; R1-051175, 3rd Generation Partnership Project (3GPP), Oct. 10-14, 2015, pp. 1-4, San Diego, USA.
(Continued)

*Primary Examiner* — Chi H Pham
*Assistant Examiner* — Soon-Dong D Hyun
(74) *Attorney, Agent, or Firm* — Renner, Otto, Boisselle & Sklar, LLP.

(57) ABSTRACT

A cellular multiple-input and multiple-output (MIMO) system has a base station. The base station has a plurality of antennas. To control a signal transmission in the MIMO system, the base station monitors at least one indicator which indicates whether a spatial resolution of the plurality of antennas allows signals received from at least two terminals to be distinguished. The base station selectively activates a multiple access transmission and reception for the at least two terminals as a function of the at least one indicator. The multiple access transmission and reception causes the at least two terminals to share a common channel.

20 Claims, 6 Drawing Sheets

(56) References Cited

OTHER PUBLICATIONS

Komiya K et al.: "Proposal of SDMA Configuration Adopting Directivity and Polarization Control," Electronics and Communications in Japan Part I, Wiley Periodicals, Inc., 2007, pp. 33-45, Hoboken, USA.

International Search Report and Written Opinion corresponding to International Application No. PCT/EP2014/075134, mailed Feb. 6, 2015.

* cited by examiner

METHOD OF CONTROLLING A SIGNAL TRANSMISSION IN A CELLULAR MIMO SYSTEM, BASE STATION, AND CELLULAR MIMO SYSTEM

FIELD OF THE INVENTION

Embodiments of the invention relate to cellular communication systems. Embodiments relate in particular to methods and devices for controlling signal transmissions in cellular multiple-input and multiple-output (MIMO) systems.

BACKGROUND OF THE INVENTION

Mobile data and voice communication continues to evidence significant growth. With increasing popularity of data and voice communication, it is more likely that the communication needs of a large number of users must to be met which are all located within a small area, a case referred to as dense crowd scenario in the art. Typical examples include sport arenas or large office buildings.

In order to increase data transmission performance and reliability, the so-called multiple input and multiple-output (MIMO) technology may be used in wireless radio telecommunication for transmitting information between a base station and terminals of users. MIMO systems may use multiple send and receive antennas for wireless communication at a base station. The MIMO technology forms the basis for coding techniques which use the temporal as well as the spatial dimension for transmitting information. The enhanced coding provided in MIMO systems allows a quality and data rate of the wireless communication to be increased.

In a massive MIMO system, the base station may include a large number of antennas, e.g. several tens or even in excess of one hundred antennas with associated transceiver circuitry. The extra antennas of the MIMO base station allow radio energy to be spatially focused which improves capacity and radiated energy efficiency. Space diversity multiple access (SDMA) is used in a massive MIMO system to keep interference low for the various terminals in the cell.

When several terminals connected to the same base station are located close to each other, the SDMA may not allow the base station to distinguish signals received from the several terminals and/or the base station may not be able to rely on SDMA to focus radio energy at a desired one of the several terminals. More than one terminal may be located in the spatial region in which the radio energy is focused by the base station. Massive MIMO systems may be deployed in buildings such as office buildings, shopping malls and so on, sport arenas or other areas in which a large density of users can occur and terminals are likely to be located close to each other. The spatial resolution which can be attained may also depend on the environment. For a rich scattered environment, the spatial resolution may in general be better. However, when terminals are very close to each other or the environment is such that the base station cannot distinguish two or more devices due to its spatial resolution, interference may increase even when SDMA is used in a cellular MIMO system.

SUMMARY OF THE INVENTION

There is a need in the art for methods, devices and systems which address at least some of the above shortcomings of conventional systems. There is in particular a need in the art for controlling the transmission of signals to and from terminals in a cellular multiple-input and multiple-output, MIMO, system. There is a need for methods, devices and systems in which interference may be reduced even when terminals are located closer to each other than the spatial resolution attained by the base station of the MIMO system.

According to embodiments of the invention, methods, devices and systems are provided in which a multiple access method is selectively activated for two or more terminals which are located close to each other. The base station may cause two or more terminals which are located closer to each other than a spatial resolution of an antenna array of a MIMO base station to share one of several orthogonal channels, e.g. by applying time division multiple access (TDMA), frequency division multiple access (FDMA) or code division multiple access (FDMA). Time diversity, frequency diversity or code diversity may be selectively activated for terminals for which the base station cannot determine based on space diversity.

According to embodiments, the multiple access method which uses a diversity other than space diversity may be activated only for terminals which are spaced by a distance which is less than the spatial resolution of the MIMO base station. The activation may be performed selectively only when space diversity does not allow the at least two terminals to be distinguished.

For other terminals which can be distinguished by the base station, e.g. terminals which are spaced by larger distances and/or which are located in rich scattered environments where reflections may aid the base station in distinguishing the terminals by space diversity, the base station may be configured not to instruct these other terminals to use the diversity other than space diversity. The reduction in throughput which is incurred when terminals must share a traffic channel when transmitting and receiving signals carrying payload data may thereby be limited to those terminals only which are located in such a manner that the base station cannot reliable distinguish the terminals when relying on space diversity only. Space diversity may be selectively combined with a diversity other than space diversity, depending on whether the base station can distinguish signals from terminals or can focus radio energy at an individual terminal when using the space diversity of a plurality of antennas, e.g. a MIMO antenna array.

According to embodiments, the multiple access method which uses a diversity other than space diversity may be activated for all terminals in the respective cell, including the at least two terminals which cannot be distinguished based on space diversity. The activation may be performed selectively only when space diversity does not allow the at least two terminals to be distinguished.

According to embodiments, the base station may use various techniques to determine whether two or more terminals shall start using a multiple access signal transmission and reception to share a common channel, e.g. a common traffic channel. The base station may use the spatial footprints of signals received from different terminals at the plurality of antennas to determine whether a diversity other than space diversity needs to be used. The base station may correlate the spatial footprint of one terminal with the spatial footprint of another terminal to determine whether a multiple access other than space diversity multiple access is to be used. Alternatively or additionally, the base station may monitor error rates of data traffic of several terminals and may activate a multiple access other than space diversity multiple access, e.g. for terminals which show a concurrent increase in error rates.

According to an embodiment, a method of controlling a signal transmission in a cellular multiple-input and multiple-output, MIMO, system is provided. The cellular MIMO system comprises a base station having a plurality of antennas. The base station monitors at least one indicator to determine whether a spatial resolution of the plurality of antennas allows signals received from at least two terminals to be distinguished. The base station selectively activates a multiple access transmission and reception for the at least two terminals as a function of the at least one indicator. The multiple access transmission and reception causes the at least two terminals to share a common channel.

To monitor the at least one indicator, the base station may determine a first spatial footprint of signals from a first terminal of the at least two terminals at the plurality of antennas. The base station may determine a second spatial footprint of signals from a second terminal of the at least two terminals at the plurality of antennas. The first spatial footprint may be a first footprint matrix. The second spatial footprint may be a second foot print matrix. Similar spatial footprints, which are determined by the base station at any rate, may thereby be used as indicator that two terminals are located so close to each other that spatial diversity multiple access alone may no longer be reliable.

The base station may selectively activate the multiple access transmission and reception is selectively if the first spatial footprint and the second spatial footprint show that the spatial resolution of the plurality of antennas does not allow signals received from the first terminal to be distinguished from signals received from the second terminal.

The base station may compute a correlation function of the first spatial footprint and the second spatial footprint. The base station may selectively activate the multiple access transmission and reception if the correlation function exceeds a threshold.

Alternatively or additionally to evaluating spatial footprints, the base station may monitor a first error rate for a first terminal and/or a second error rate for a second terminal to determine whether the multiple access transmission and reception is to be activated. The first error rate may be a bit error rate for uplink communication, for downlink communication, or a combined bit error rate for uplink and downlink communication between the base station and the first terminal. The second error rate may be a bit error rate for uplink communication, for downlink communication, or a combined bit error rate for uplink and downlink communication between the base station and the second terminal.

The multiple access transmission and reception may be selectively activated if both the first error rate and the second error rate exhibit a time-dependent increase. The multiple access transmission and reception may be selectively activated if both the first error rate and the second error rate exhibit a concurrent time-dependent increase. Time-correlated increases in error rates may thereby be used as indicator that two terminals are located so close to each other that spatial diversity multiple access alone may no longer be reliable.

When detecting an increase in only one of the first error rate and the second error rate, the base station may execute a procedure to identify an other terminal which interferes with the respective terminal. The base station may compare the spatial footprint for the terminal which exhibits the increase in error rate to the spatial footprints of several other terminals to determine which other terminal may interfere with the terminal for which the error rate increases. Alternatively or additionally, the base station may execute a dedicated search algorithm to identify the other terminal which interferes with the terminal which exhibits the increase in error rate. This may comprise causing an other terminal to be silent in at least one frame and monitoring the effect on the error rate of the terminal which exhibits the increase in error rate.

The first error rate and the second error rate may respectively be bit error rates determined for payload transmissions.

When the multiple access for transmission and reception is activated, the base station may transmit payload data to the at least two terminals in accordance with the activated multiple access scheme. When the multiple access for transmission and reception is activated, the base station may receive payload data from the at least two terminals in accordance with the activated multiple access scheme.

The common channel may be a traffic channel for transmission of payload data in the uplink and/or downlink.

The multiple access transmission and reception which is selectively activated may be a code division multiple access.

The multiple access transmission and reception which is selectively activated may be a frequency division multiple access.

The multiple access transmission and reception which is selectively activated may be a time division multiple access.

The base station may allocate identical data bandwidths to a first terminal of the at least two terminals and to a second terminal of the at least two terminals which share the common channel. When there are more than two terminals which are caused to share the common channel, the bandwidth may be split such that each terminal has the same bandwidth. Such schemes are particularly simple to implement, e.g. by allowing the terminals to use a resource in a round robin fashion. The bandwidths may be the same for both uplink and downlink transmissions. The bandwidth allocation may be made depending on bandwidth requirements in the uplink and/or downlink of both the first terminal and the second terminal.

The base station may allocate different data bandwidths to a first terminal of the at least two terminals and to a second terminal of the at least two terminals which share the common channel. When there are more than two terminals which are caused to share the common channel, the bandwidth may be split such that at least two terminals have different bandwidths. The first terminal and the second terminal may be assigned different bandwidths for both uplink and downlink transmissions. The bandwidth allocation may be made depending on bandwidth requirements in the uplink and/or downlink of both the first terminal and the second terminal.

The base station may allocate different bandwidths to uplink signal transmissions and downlink signal transmissions of a terminal of the at least two terminals which share the common channel. The bandwidth allocation may be made depending on the data traffic in the uplink and downlink which the terminal presently requires.

The base station may selectively deactivate the multiple access transmission and reception for the at least two terminals when the at least two terminals are located relative to the base station such that the spatial resolution of the plurality of antennas allows signals received from the at least two terminals to be distinguished.

The base station may monitor spatial footprints of signals received from the at least two terminals at the plurality of antennas of the base station, while the multiple access transmission and reception for the at least two terminals is activated, to determine whether the multiple access transmission and reception for the at least two terminals is to be deactivated. The base station may correlate spatial footprints of the at least two terminals continuously or periodically while the multiple access transmission and reception for the at least two terminals is activated to determine whether the multiple access transmission and reception for the at least two terminals is to be deactivated. The multiple access transmission and reception for the at least two terminals may be deactivated when the spatial footprints differ from each other, e.g. when a quantity which quantifies the difference in spatial footprints becomes greater than a threshold.

Alternatively or additionally, the base station may temporarily deactivate the multiple access transmission and reception for the at least two terminals. When bit error rates for the at least two terminals are determined to be greater than a threshold, the multiple access transmission and reception for the at least two terminals may remain activated. When bit error rates for the at least two terminals are determined to be less than a threshold, the multiple access transmission and reception for the at least two terminals may be deactivated.

The base station may extrapolate a time-dependent change of the at least one indicator to determine whether the multiple access transmission and reception is to be activated. This implements a look-ahead logic for determining whether space diversity may no longer allow the at least two terminals to be reliably distinguished.

Even when the multiple access transmission and reception for the at least two terminals is activated, space diversity multiple access may continued to be used to reduce interferences between signals transmitted to or from the at least two terminals and other signals transmitted to or from another terminal which is different from the at least two terminals.

A base station for a cellular MIMO system comprises a plurality of antennas. The base station comprises a logic coupled to the plurality of antennas. The logic is configured to monitor at least one indicator to determine whether a spatial resolution of the plurality of antennas allows signals received from at least two terminals to be distinguished. The logic is configured to selectively activate a multiple access transmission and reception for the at least two terminals as a function of the at least one indicator. The multiple access transmission and reception causes the at least two terminals to share a common channel.

The logic may be configured to determine a first spatial footprint of signals from a first terminal of the at least two terminals at the plurality of antennas and a second spatial footprint of signals from a second terminal of the at least two terminals at the plurality of antennas.

The logic may be configured to selectively activate the multiple access transmission and reception if the first spatial footprint and the second spatial footprint show that the first terminal and the second terminal are located in proximity to each other.

The logic may be configured to determine a correlation of the first spatial footprint and the second spatial footprint.

The logic may be configured to monitor a first error rate for a first terminal and a second error rate for a second terminal. The error rates may comprise uplink, downlink or combined uplink and downlink bit error rates.

The logic may be configured to selectively activate the multiple access transmission and reception if both the first error rate and the second error rate exhibit a time-dependent increase.

The logic may be configured to configured to select the multiple access transmission and reception to be one of a code division multiple access, a frequency division multiple access, or a time division multiple access.

The logic may be configured to selectively deactivate the multiple access transmission and reception for the at least two terminals when the spatial resolution of the plurality of antennas allows signals received from the at least two terminals to be distinguished.

The base station may be configured to perform the method of any one of the embodiments disclosed herein. The respective control and evaluation operations may be performed by the base station logic.

A terminal for a cellular MIMO system according to an embodiment comprises a wireless interface having at least one antenna and a control device coupled to the wireless interface. The control device is configured to control the wireless interface such that a multiple access technique other than space diversity multiple access is selectively employed for receiving and transmitting signals via the wireless interface when a further terminal is spaced from the terminal by a distance which is less than the spatial resolution of the base station at the respective location.

A terminal having such a configuration can selectively activate time division multiple access, frequency division multiple access or code division multiple access when the base station cannot distinguish signals received from the terminal and one or several further terminals.

The control device may be configured to receive a signaling message from the base station which indicates that the terminal shall use the multiple access technique different from the space diversity multiple access to share a common channel with the further terminal.

The wireless interface may be configured for communication with a long term evolution, LTE, cellular communication network.

The terminal may be mobile phone.

A cellular MIMO system according to an embodiment comprises a plurality of terminals and the base station according to an embodiment.

In the methods, devices and systems according to any one of the various embodiments, the base station may be a base station for a massive MIMO system. The base station may include more than ten antennas, e.g. several tens of antennas, to transmit signals. The base station may include more than hundred antennas to transmit signals. The base station antennas may be distributed. The plurality of antennas may comprise several sub-sets located at several locations remote from one another. The several sub-sets may interact with one another in cooperative MIMO.

In the methods, devices and systems according to any one of the various embodiments, the plurality of antennas may be a massive MIMO antenna array.

Embodiments of the invention may be used for controlling signal transmissions by dynamically activating a multiple access other than space diversity multiple access depending on whether the base station can reliably distinguish two or more terminals.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the invention will be described in more detail with reference to the accompanying drawings in which like numerals refer to like elements.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Identical or similar reference signs in various drawings refer to identical or similar components. Any coupling between components or devices shown in the figures may be a direct or an indirect coupling unless specifically noted otherwise.

Figure 1:
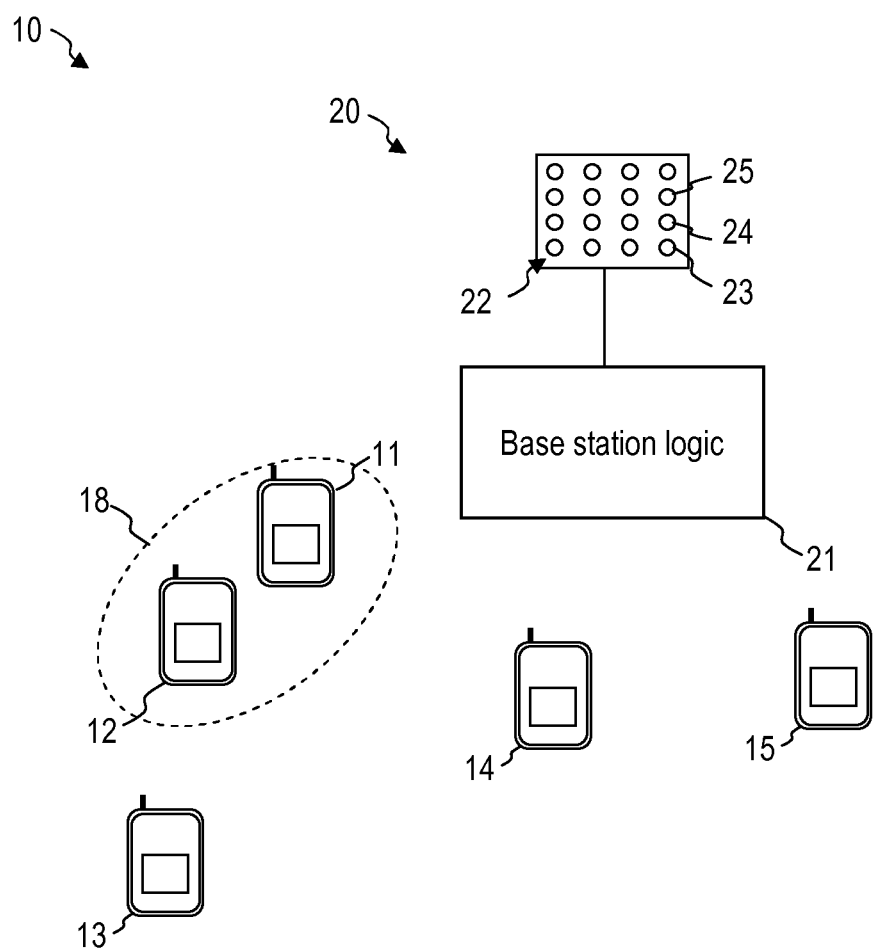
FIG. 1 shows a schematic representation of a communication system according to an embodiment.

FIG. 1 shows a communication system 10 according to an embodiment. The communication system 10 is a multiple-input and multiple-output (MIMO) system and includes a MIMO base station 20 according to an embodiment. The MIMO system may be a massive MIMO system, and the MIMO base station 20 may have a large number of antennas, such as several tens or in excess of one hundred antennas.

The base station 20 comprises a plurality of antennas 22. The antennas 23-25 may be arranged in a two- or three-dimensional spatial array on a carrier. The base station 20 also comprises associated transceivers for the antennas 23-25. The base station 20 may be a base station for a massive MIMO system. Accordingly, the base station 20 may have several tens or in excess of one hundred antennas 23-25. The plurality of antennas may also be spatially distributed to various locations, e.g. in cooperative MIMO. It is also possible that several base stations interact in cooperative MIMO, with the plurality of antennas being distributed over various locations.

The communication system 10 comprises several terminals 11-15 configured to communicate with the base station 20. Each one of the terminals 11-15 may be configured to transmit a pilot signal to the base station. The base station 20 may be configured to analyze the pilot signal received at the plurality of antennas 22 of the base station to determine channel characteristics for a radio signal transmission between the plurality of antennas 22 of the base station 20 and the respective terminal 11-15. For illustration, a logic 21 of the base station 20 may be configured to determine a footprint matrix based on a pilot signal received by the plurality of antennas 22 from a terminal. The footprint matrix may be indicative of a spatial footprint of a signal received at the plurality of antennas 22 from the terminal 11. The logic 21 may use the footprint matrix to control the plurality of antennas 22 when transmitting radio signals to the respective terminal. The logic 21 may compute a Hermitian conjugate of the footprint matrix to determine a time delay and amplitudes of radio signals transmitted by each one of the plurality of antennas 22 to focus radio energy in a sector in which the respective terminal is located. For illustration, the logic 21 may control a transmission of signals by the plurality of antennas 22 based on radio channel properties, e.g. based on a footprint matrix, obtained for a pilot signal transmission from a terminal 11 to control a transmission of signals by the plurality of antennas 22 to transmit a downlink (DL) signal carrying control signaling and/or payload data to a spatial sector in which the terminal 11 is located. Similarly, the base station 20 may be configured to determine channel properties for transmission between any other terminal 12-15 and the base station 20 and to use the channel properties for focusing radio energy at the respective terminal, for example. Space diversity multiple access may be used in which the base station 20 to reduce interference between signals transmitted between the base station 20 and the various terminals 11-15 in the cell.

In some cases, two or more terminals 11, 12 may be located close to each other. The two or more terminals 11, 12 may be located within one region 18 in which radio energy from the base station 20 may be focused. The spacing between the two or more terminals 11, 12 may be less than the spatial resolution of the base station at the respective location and for the environment in which the two or more terminals 11, 12 are located. The proximity of the two or more terminals 11, 12 may then lead to increased bit error rates, for example, because the base station 20 can no longer reliably distinguish the two or more terminals when relying on space diversity alone.

To mitigate these problems, the base station 20 may selectively cause the two or more terminals 11, 12 to use a multiple access method other than space diversity multiple access when the base station 20 transmits signals to the terminals 11, 12 and when the base station 20 receives signals from the terminals 11, 12. A multiple access method such as time division multiple access (TDMA), frequency division multiple access (FDMA) or code division multiple access (CDMA) may be dynamically activated when space division multiple access (SDMA) does not sufficiently suppress interference for the communication between two or more terminals 11, 12 and the base station 20. The activation of the multiple access method which is different from SDMA causes the two or more terminals 11, 12 to share a common channel. The common channel may be shared for transmission of payload data and, optionally, also for pilot signaling. The base station 20 may also selectively deactivate the multiple access method different from SDMA again when the two or more terminals 11, 12 become spatially separated and/or the environment of the two or more terminals 11, 12 changes to a rich scattered environment, in which the base station 20 can distinguish the two or more terminals 11, 12.

When a first terminal 11 and a second terminal 12 are instructed to use a multiple access method other than SDMA to share a common channel, these terminals 11, 12 may be considered to form a group of terminals which share one common channel for transmitting payload data. For other terminals 13-15 which are not included in the group, the base station 20 may continue to use SDMA. Signals to or from the group of terminals 11, 12 on the one hand and signals to or from each other terminal 13-15 which is not included in the group may on the other hand may still be distinguished based on the different footprints of the signals at the antenna array 22. I.e., spatial diversity may be used to reduce interference between any terminal 11, 12 of the group which shares a common channel and any other terminal 13-15 not included in group. Diversity other than spatial diversity, e.g. time diversity, frequency diversity or code diversity, may be used to reduce interference between terminals 11, 12 within a group for which spatial diversity does not lead to satisfactory results, e.g. because the terminals 11, 12 are located too close to each other.

Figure 2:
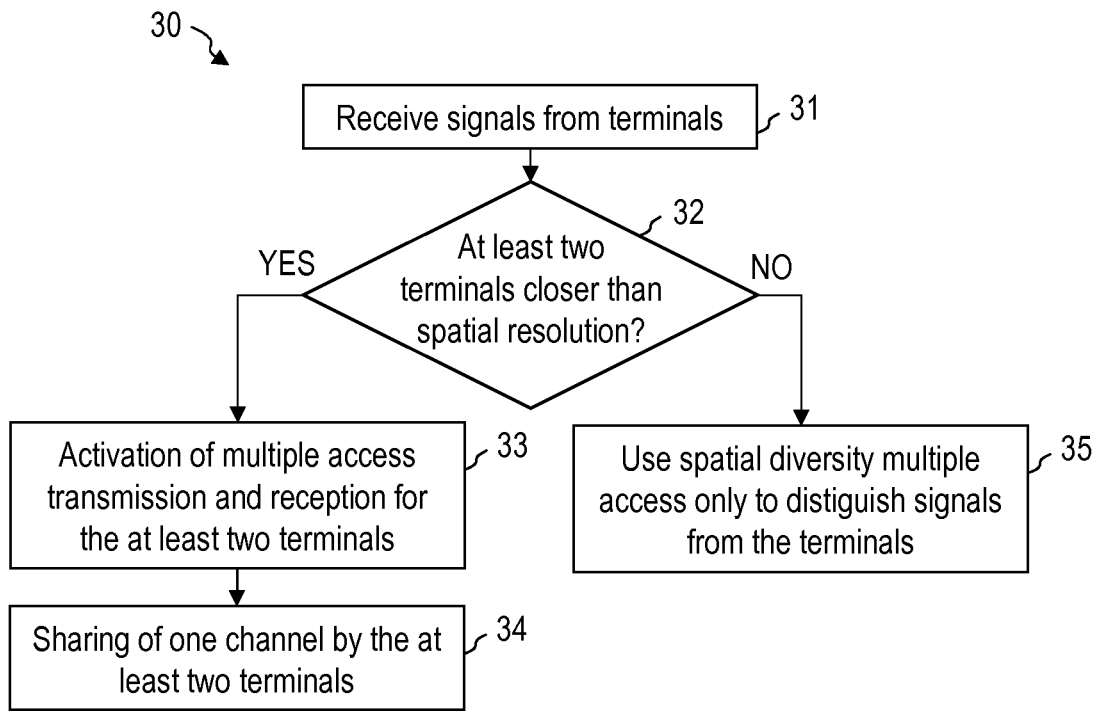
FIG. 2 is a flow chart of a method according to an embodiment.

FIG. 2 is a flow chart of a method 30 according to an embodiment. The method 30 may be performed by a base station according to an embodiment.

At 31, the base station receives signals from terminals at a plurality of antennas. The signals may comprise pilot signals. The base station may determine channel characteristics for each one of the terminals from the received pilot signals. The base station may use the determined channel characteristics for separating signals from different terminals or for transmitting signals to an individual terminal, thereby using spatial diversity.

At 32, the base station may determine whether two or more terminals are arranged to the base station in such a manner that the base station cannot reliably distinguish from which one of the two or more terminals a signal is received.

The base station may use various techniques to determine whether the two or more terminals are arranged to the base station in such a manner that the base station cannot reliably distinguish from which one of the two or more terminals a signal is received. For illustration, a spatial footprint of signals received from a first terminal at the plurality of antennas may be compared to a spatial footprint of signals received from a second terminal at the plurality of antennas to determine whether the terminals are located so close to each other that the base station cannot reliably distinguish from which one of the two or more terminals a signal is received.

Alternatively or additionally, changes in an error rate for data transmissions for a terminal may be monitored to determine whether the multiple access technique different from SDMA should be activated.

Alternatively or additionally, correlated changes in error rates for data transmissions for the first terminal and the second terminal may be monitored to determine whether the terminals are located so close to each other that the base station cannot reliably distinguish from which one of the two or more terminals a signal is received. The bit error rates may be uplink or downlink bit error rates, or a combination of uplink and downlink bit error rates.

Alternatively or additionally, a change in an error rate detected for uplink and/or downlink for a terminal may cause the base station to identify at least one other terminal which is a potential interferer. The base station may monitor the spatial footprint of signal received from the terminal which exhibits an increase in error rate to the spatial footprints of other terminals to identify at least one other terminal which has a same or similar spatial footprint. This at least one other terminal is the potential interferer, and the multiple access different from the SDMA may be activated to reduce interference. The base station may employ other techniques to identify terminals which potentially interfere with one another, e.g. by silencing terminals to identify sources of interference.

Alternatively or additionally, information on a proximity of terminals may be taken into account. Terminals which are proximity service (ProSe) enabled terminals may determine whether they are located in proximity to each other and may inform the base station thereof. The base station may then determine that terminals which are located close to each other shall use a multiple access method other than SDMA to receive signals from the base station or to transmit signals to the base station.

The base station may determine whether the two or more terminals are located within one region which is smaller than the spatial resolution attained by the plurality of antennas in SDMA at the respective location.

At 33, if the two or more terminals are located close to each other or the base station cannot distinguish spatial footprints of signals from the two or more terminals for other reasons, the base station requests the two or more terminals to activate a multiple access method other than SDMA. The base station may transmit a multicast message to the terminals which are located close to each other or which otherwise generate similar spatial footprints at the plurality of antennas to instruct the terminals to use FDMA, CDMA or TDMA, for example. The base station may use dedicated signaling to each one of the terminals to allocate individual parameters, such as the number of frames or the number of frequency sub-bands which a terminal may use in TDMA or FDMA, respectively.

The two or more terminals are made to share a common channel for transmitting data traffic in the uplink and downlink, for example. This leads to a reduction in throughput. However, because the multiple access method different from SDMA is dynamically activated only when spatial diversity is not sufficient to reliably distinguish terminals, the reduction in throughput may be limited to only those terminals which temporarily cannot be distinguished from at least one other terminal by the base station.

The two or more terminals share the bandwidth provided by the common channel. The base station may allocate resources to the two or more terminals in such a way that the common channel is shared symmetrically, i.e. that each one of the terminals which shares the common channel has the same fraction of the total bandwidth of the common channel. The base station may allocate resources to the two or more terminals in such a way that the common channel is shared asymmetrically, i.e. that one of the terminals which shares the common channel has a greater fraction of the total bandwidth of the common channel than at least one other terminal. The data rate requirements of the various terminals which share one common channel may be taken into account by the base station when allocating the resources.

The bandwidth of the channel may be split symmetrically for uplink and downlink transmissions for each one of the terminals in the group. The base station may also allocated different bandwidths for downlink and uplink transmissions of one or several of the terminals which share the common channel.

At 34, the two or more terminals which cannot be reliably distinguished by the base station when using spatial diversity share a common channel. The common channel may be the frames in which data may be transmitted and received when the multiple access method is TDMA. The common channel may be a frequency subband or several frequency sub-bands when the multiple access method is FDMA. The common channel may be a code or several codes when the multiple access method is CDMA.

At 33 and 34, the multiple access method different from SDMA may be limited to only those terminals which have the same or similar channel characteristics when using SDMA, i.e., to those terminals which generate the same or a similar spatial footprint at the plurality of antennas. All other terminals which do not have a spatial signal footprint at the plurality of antennas as another terminal do not need to use an multiple access method other than SDMA.

When there are no terminals connected to the base station which are located in such a way that the base station cannot distinguish between the terminals based on spatial diversity, the method proceeds from step 32 to step 35.

At 35, the spatial diversity multiple access may be used for all terminals to reduce interference. It is not required for two or more terminals to share a common channel for transmitting and receiving signals. The reduction in throughput which would be associated with such a sharing of a traffic channel, for example, may thereby be avoided as long as it is not required because of the close proximity of two or more terminals.

At 33 and 34, the multiple access method different from SDMA does not need to be limited to only those terminals which have the same or similar channel characteristics when using SDMA. For illustration, several terminals in addition to the at least two terminals which have the same or similar channel characteristics when using SDMA may also be requested to start using the multiple access method different from SDMA.

At 33 and 34, the multiple access method different from SDMA may be activated for all terminals in the respective cell, including the at least two terminals which have the same or similar channel characteristics when using SDMA. The base station does not need to identify the potential interferer in this case. For illustration, a change in error rate for a first terminal may cause the base station to request activation of the multiple access method different from SDMA for all terminals in the cell.

The base station may monitor any one or any combination of various indicators to determine whether two or more terminals shall be requested to share a common channel by using TDMA, FDMA or CDMA, for example.

The base station may determine a first spatial footprint of a signal received from a first terminal at the plurality of antennas. The first spatial footprint may comprise information on changes of an amplitude of the received first signal and on changes of a phase shift, i.e. time-delay, of the received first signal between the different antennas of a MIMO antenna array, for example. The first spatial footprint may be a first footprint matrix. The base station may determine a second spatial footprint of a signal received from a second terminal at the plurality of antennas. The second spatial footprint may comprise information on changes of an amplitude of the received second signal and on changes of a phase shift, i.e. time-delay, of the received second signal between the different antennas of a MIMO antenna array, for example. The second spatial footprint may be a second footprint matrix. The signals for which the footprints are determining may be pilot signals which include a MIMO training sequence.

The base station may determine whether the first spatial footprint and the second spatial footprint are identical or similar. The base station may correlate the first spatial footprint and the second spatial footprint. Various quantities may be determined to compute a correlation between the first spatial footprint and the second spatial footprint. For illustration, a correlation $$C = \Sigma_i \langle |(f_1(x_i) - f_2(x_i))|^2 \rangle \quad (1)$$

may be computed and compared to a threshold, where $x_i$ denotes positions of antennas of the antenna array, $f_1(x_i)$ is the first spatial footprint of a pilot signal from a first terminal which includes information on an amplitude and phase at the antenna at position $x_i$, and $f_2(x_i)$ is the second spatial footprint of a pilot signal from a second terminal which includes information on an amplitude and phase at the antenna at position $x_i$. The averaging may be performed over time, for example.

The correlation C may be compared to a threshold to determine whether the base station can reliably distinguish signals from the first terminal and the second terminal. The correlation C may be compared to the threshold to determine whether the base station can reliably focus radio energy at only one of the first terminal and the second terminal.

Other implementations may be used. For illustration, a correlation $$C = \Sigma_i [\langle (f_1(x_i) f_2^*(x_i)) \rangle + \langle (f_2(x_i) f_1^*(x_i)) \rangle - \langle (f_1(x_i)) \rangle \langle f_2^*(x_i) \rangle - \langle (f_2(x_i)) \rangle \langle (f_1^*(x_i)) \rangle ] \quad (2)$$

may be computed and compared to a threshold, where the asterisk (*) denotes complex conjugation. The averaging may be performed over time, for example. The correlation C may be compared to a threshold to determine whether the base station can reliably distinguish signals from the first terminal and the second terminal. The correlation C may be compared to the threshold to determine whether the base station can reliably focus radio energy at only one of the first terminal and the second terminal.

Still other implementations may be used. For illustration, the eigenvectors and eigenvalues of the first footprint matrix computed for the pilot signal of the first terminal may be compared to the eigenvectors and eigenvalues of the second footprint matrix computed for the pilot signal of the second terminal. The traces of the first and second footprint matrix may be compared to each. It may be determined whether one or several eigenvectors of the first footprint matrix are parallel to one or several eigenvectors of the second footprint matrix.

Similar or identical spatial footprints at the base station antenna array may also result when a terminal comprises two antennas or more than two antennas. If the two or more channels that cannot be distinguished from each other originate from the same terminal, a rank for the terminal may be reduced. I.e., a diversity mode may be used in which two antennas or more than two antennas of the terminal may be used as one single antenna only. This diversity mode may be employed for both uplink and downlink communication. This diversity mode may be employed for downlink communication only.

Figure 3:
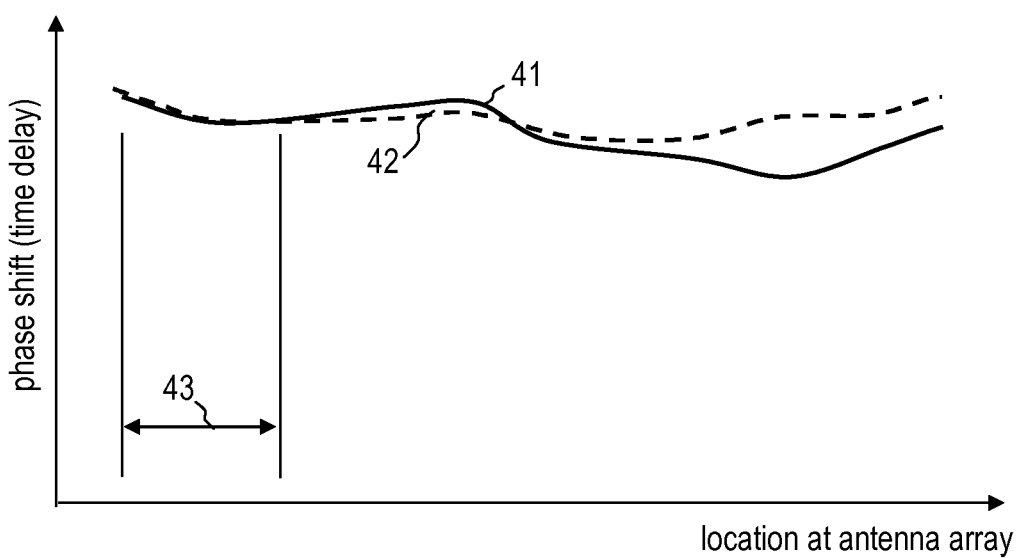
FIG. 3 illustrates indicators monitored by a base station according to an embodiment to determine whether a multiple access technique different from space diversity multiple access is to be activated.

The operation of the base station which uses the spatial footprint of signals to determine whether an additional multiple access method different from SDMA is to be activated will be illustrated further with reference to FIG. 3.

FIG. 3 shows a first spatial footprint 41 of a signal received from a first terminal at the plurality of antennas. A second spatial footprint 42 is obtained for a signal received from a second terminal at the plurality of antennas. The illustrated footprints may respectively indicate the time delay of an arrival time of a maximum of the electric or magnetic field strength along a coordinate axis at the location of the base station.

The first spatial footprint 41 and the second spatial footprint 42 may be significantly different from each other for at least some coordinates. However, the limited size 43 of an antenna array may make it difficult to identify the differences between the first spatial footprint 41 and the second spatial footprint 42. I.e., in the spatial range 43 over which the antenna array extends, the first spatial footprint 41 and the second spatial footprint 42 are too similar for the base station to be able to reliably distinguish signals from the first terminal and signals from the second terminal based on their spatial footprints 41, 42.

The correlation or similarity between the first spatial footprint 41 and the second spatial footprint 42 in the range 43 detectable by the antenna array may trigger the base station to selectively cause the first and second terminals to share a common channel, e.g. by using CDMA, TDMA or FDMA.

In other implementations, an increase in an uplink and/or downlink bit error rate for a first terminal may trigger the base station to cause all terminals to start using the multiple access technique which is different from SDMA.

In other implementations, an increase in an uplink and/or downlink bit error rate for a first terminal may trigger the base station to execute a search procedure to identify whether the increase in bit error rate is due to the fact that space diversity does not allow the base station to distinguish the first terminal and second terminal. The search for a potentially interfering terminal may be based on correlating spatial footprints, as explained in more detail with reference to FIG. 3. Alternatively or additionally, the search for a potentially interfering terminal may be performed such that the base station silences one or several terminals in the uplink and/or downlink to monitor whether this has an effect on the bit error rate for the first terminal. Alternatively or additionally, correlated changes in bit error rates may be monitored as will be explained in more detail below.

In some implementations, a concurrent increase in error rates of transmissions from a first terminal and a second terminal may be used to determine that the first and second terminals should start sharing one channel by using CDMA, TDMA or FDMA. In this case, the fact that the base station may no longer be able to reliably distinguish between the channel characteristics of two terminals when the two terminals are spaced more closely than the spatial resolution of the base station leads to an onset of errors. The errors may be bit errors detected in frames transmitted to the base station. The errors may be bit errors in headers or payload data of frames. The concurrent increase in error rate for two terminals is indicative that the two terminals may move such that they are located close to each other and another multiple access method must be used to distinguish the first terminal and the second terminal, as illustrated in FIG. 4.

Figure 4:
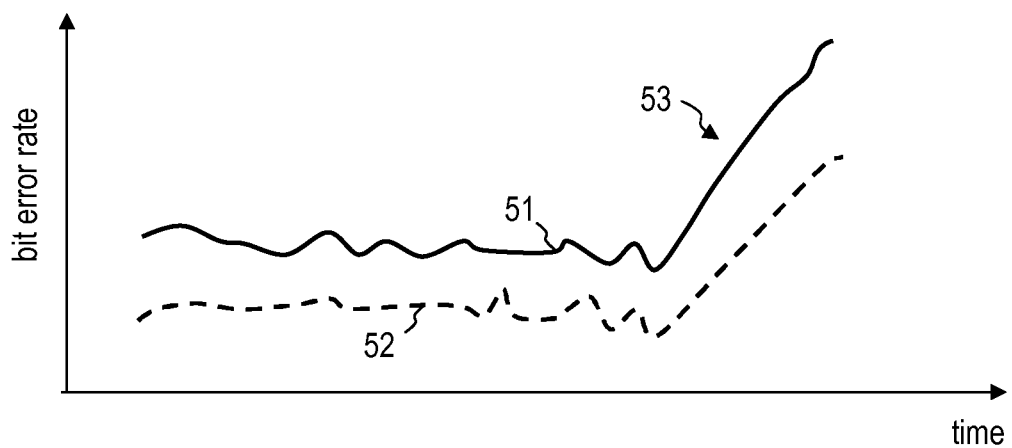
FIG. 4 illustrates other indicators monitored by a base station according to an embodiment to determine whether a multiple access technique different from space diversity multiple access is to be activated.

FIG. 4 is a diagram which shows a first error rate 51 determined for transmissions from or to a first terminal to the base station. A second error rate 52 may be determined for transmissions from or to a second terminal to the base station. The first error rate 51 and the second error rate 52 are shown as a function of time. The first error rate 51 and the second error rate 52 show an onset of an increase 53. The first error rate 51 and the second error rate 52 show an increase 53 which is correlated as a function of time, i.e., the first error rate 51 and the second error rate 52 increase concurrently. This indicates that the first terminal and the second terminal may be getting close to each other. The base station causes the first terminal and the second terminal to use a multiple access method other than SDMA for uplink and downlink data transmissions.

The base station may request the first terminal and the second terminal to start sharing a channel for payload data transmission only when the reduction in throughput is commensurate is commensurate with the reduction in bit error rate which can be attained. For illustration, the base station may request several terminals to start using FDMA, TDMA or CDMA only when the bit error rate of at least one terminal has increased to be greater than a threshold.

The base station may compare uplink error rates or downlink error rates to detect interference between terminals which triggers the multiple access technique different from SDMA to be activated. The base station may compare both uplink error rates and downlink error rates to detect interference between terminals which triggers the multiple access technique different from SDMA to be activated.

When the base station detects an increase in an error rate for one terminal which is not accompanied by a concurrent increase for another terminal, the base station may perform a search procedure to identify the terminals which potentially interfere with one another because spatial diversity may no longer allow the base station to distinguish the terminals. The search procedure may comprise computing correlations between a plurality of spatial footprints. The search procedure may comprise temporarily silencing terminals to identify a potential interferer.

The time-dependent changes monitored in the bit error rate, the spatial footprint or other indicators for spatial proximity of terminals may be used by the base station to perform look-ahead logic operations. For illustration, when the base station discovers the correlated increased 53 in bit error rates of two terminals, the two terminals may be caused to start using FDMA, TDMA or CDMA before they are located so close to each other that they generate the same spatial footprint at the plurality of antennas. Similarly, a look-ahead function may also be implemented when the base station uses the spatial footprint of pilot signals to determine whether the multiple access technique other than SDMA is to be activated.

Figure 5:
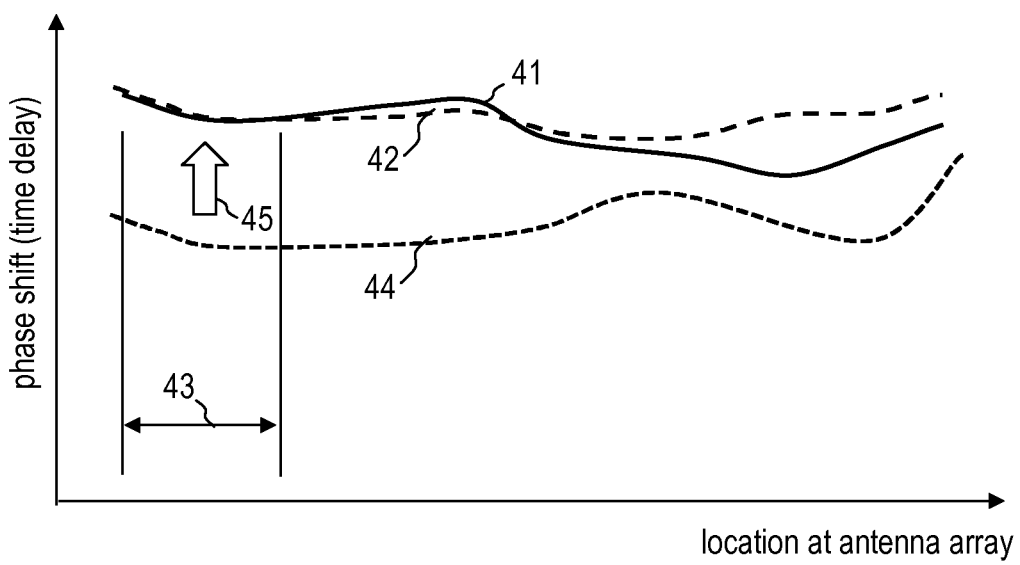
FIG. 5 illustrates other indicators monitored by a base station according to an embodiment to determine whether a multiple access technique different from space diversity multiple access is to be activated.

FIG. 5 is a diagram which shows a first spatial footprint 41 of a signal received from a first terminal at the plurality of antennas. A second spatial footprint 44 is obtained for a signal received from a second terminal at the plurality of antennas at one point in time. By tracking the time-dependent changes of the second spatial footprint 44, the base station may determine whether the second spatial footprint undergoes a change 45 such that it becomes more similar to the first spatial footprint 41. For a quantitative analysis, correlations between footprint matrices may be computed, for example. The base station may execute a look-ahead function in which the base station detects that the second spatial footprint 44 is getting similar to the first spatial footprint 41, and may cause the first terminal and the second terminal to start using FDMA, TDMA or CDMA before they are located so close to each other that they generate the same spatial footprint at the plurality of antennas.

Time-dependent changes in the footprint or other indicators may also be monitored by the base station to determine whether the multiple access technique different from the SDMA may be deactivated again. For illustration, the second spatial footprint 42 may change to the second spatial footprint 44 when the second terminal moves away from the first terminal or when the environment becomes a rich scattered environment in which reflections may aid the base station to discriminate terminals even when they are located close to each other. When the base station detects that it can again discriminate the two terminals which share the same common channel for data traffic, the base station may cause the two terminals to stop using the multiple access scheme which is different from SDMA. Spatial diversity may then be used again to discriminate the two terminals.

Figure 6:
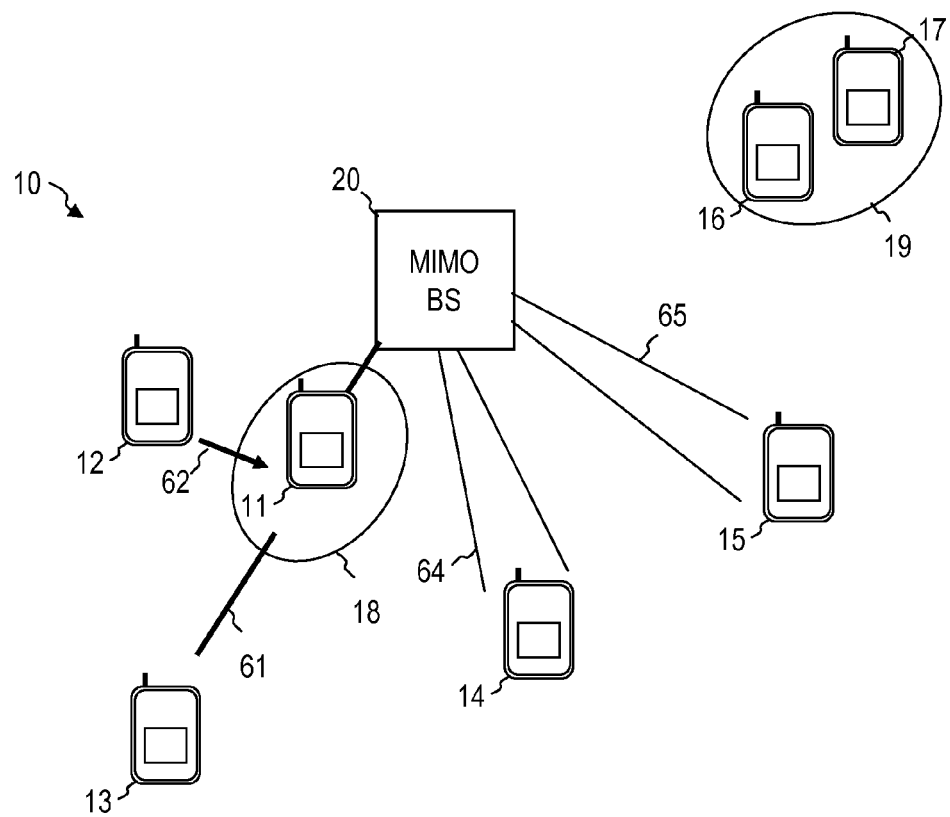
FIG. 6 shows a schematic representation of a communication system according to an embodiment.

FIG. 6 illustrates a cellular MIMO system in which a base station 20 is configured to monitor time-dependent changes of spatial footprints and/or error rates. The second terminal 12 may move towards the first terminal 11 as shown by arrow 62. The base station 20 may detect that the second terminal 12 approaches the region 18 to which the base station 20 may focus its radio energy. This triggers the base station 20 to request the first terminal 11 and the second terminal 22 to start using a multiple access technique for transmission and reception of signals, in addition to SDMA. The first terminal 11 and the second terminal 12 may start sharing the common channel even before they are both located in the region 18 and before they are spaced by less than the spatial resolution of the antenna array of the base station 20.

Other terminals 13-15 may be distinguished from both the first terminal 11 and the second terminal 12 based on their different footprints. For illustration, even a terminal 13 which is located along the same line of sight (LoS) 61 as the first terminal 11 and the second terminal 12 may be distinguished from both the first terminal 11 and the second terminal 12 due to different wave fronts of the electromagnetic radiation.

Terminals 14, 15 which are located with a greater spacing from each other terminal and/or which are located in rich scattered environments do not need to participate in using the multiple access scheme activated for the first terminal 11 and the second terminal 12. The base station 20 may direct signals to the terminal 14 in a beam 64 or may even focus radio energy at the terminal 14. The base station 20 may direct signals to the terminal 15 in a beam 65 or even focus radio energy at the terminal 15.

There may be more than one group of terminals which are located so close to each other that the base station does no longer rely on space diversity for distinguishing the terminals. For illustration, two further terminals 16, 17 may be located in a region 19 to which the base station 20 may focus its radio energy. The base station 20 may cause the two further terminals 16, 17 to start using CDMA, TDMA, FDMA or another multiple access technique to distinguish signals from the two further terminals 16, 17.

When several groups of terminals, such as a first group with terminals 11, 12 and a second group with terminals 16, 17 are formed, the base station 20 may still use space diversity to determine whether a signal comes from the first group or the second group, for example. A diversity scheme other than space diversity is used to determine which terminal of the respective first group or which terminal of the second group respectively transmitted a signal to the base station, for example.

Figure 7:
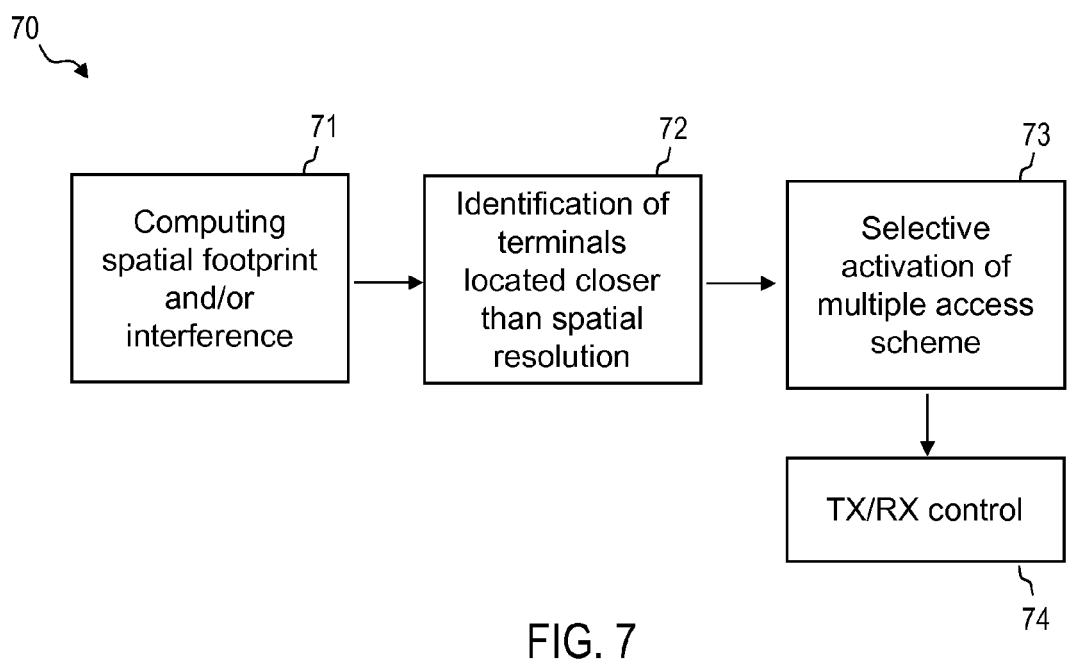
FIG. 7 is a functional block diagram of a logic of a base station according to an embodiment.

FIG. 7 is a functional block diagram 70 of the base station logic. The base station logic 21 may have the configuration illustrated in FIG. 7. The various functional modules may be implemented in hardware, in software, in firmware, or a combination thereof.

The base station logic may comprise a computing module 71 for computing the spatial footprint for signals from different terminals and/or for computing bit error rates for different terminals. The computing module 71 may be configured to compute a footprint matrix which indicates that amplitude and phase changes for a signal of a space diversity channel detected at the plurality of antennas of the base station.

The base station logic may comprise an identification module 72 which identifies whether two or more terminals are located so close to each other that the base station cannot reliably distinguish the signals from the two or more terminals based on spatial diversity.

The base station logic may comprise a control module 73 which selectively activates a multiple access scheme different from SDMA to be used by two or more terminals which are located so close to each other that the base station may not be able to distinguish the two or more terminals based on spatial diversity. The control module 73 may set parameters, such as bandwidths, for a common channel which is to be used by the two or more terminals.

The base station logic may comprise a TX/RX control module 74 which controls transmitter and/or receiver paths of the base station. The TX/RX control module 74 may be configured to process received uplink signals from the two or more terminals in accordance with the multiple access scheme which is to be used by the two or more terminals. The TX/RX control module 74 may be configured to transmit downlink signals to the two or more terminals in accordance with the multiple access scheme which is to be used by the two or more terminals. The TX/RX control module 74 may also be configured to cause the transmission of a multicast message and, optionally, dedicated signaling messages to the two or more terminals to activate the multiple access method which is different from SDMA.

Figure 8:
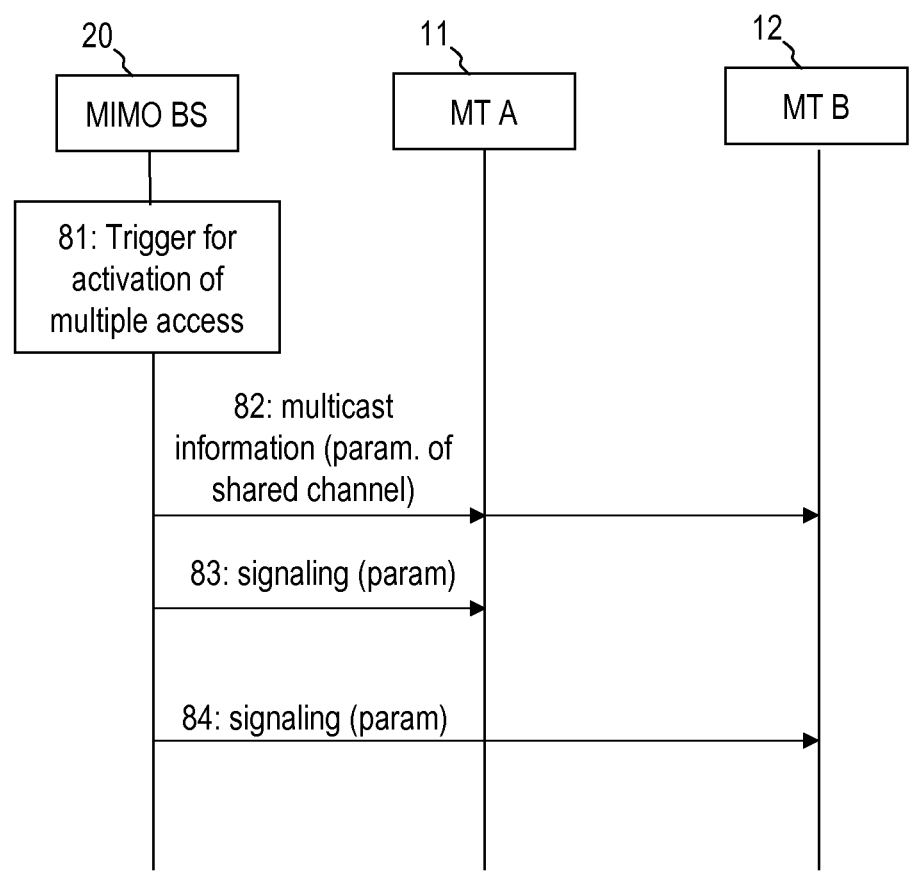
FIG. 8 is a diagram representing a signal flow in a communication system according to an embodiment.

FIG. 8 illustrates a signaling in a communication system according to an embodiment. The communication system includes a MIMO base station 20 and a plurality of terminals 11, 12.

At 81, the MIMO base station 20 determines that several terminals are positioned such that the base station 20 cannot reliably distinguish the several terminals based on spatial diversity.

The MIMO base station 20 may transmit information in a multicast message 82. The multicast message may include information on the channel which is to be shared by the several terminals.

At 83, the base station may use dedicated control signaling as part of a downlink control channel to transmit individual parameters to a first terminal 11 which shares the common channel. The individual parameters may include information on a bandwidth in the shared channel which is allocated to the first terminal 11, for example. The individual parameters may include information on the time slots or frequency sub-bands in which the first terminal 11 may transmit or receive signals, respectively.

At 84, the base station may use dedicated control signaling as part of a downlink control channel to transmit individual parameters to a second terminal 12 which shares the common channel. The individual parameters may include information on a bandwidth in the shared channel which is allocated to the second terminal 12, for example. The individual parameters may include information on the time slots or frequency sub-bands in which the second terminal 12 may transmit or receive signals, respectively.

Figure 9:
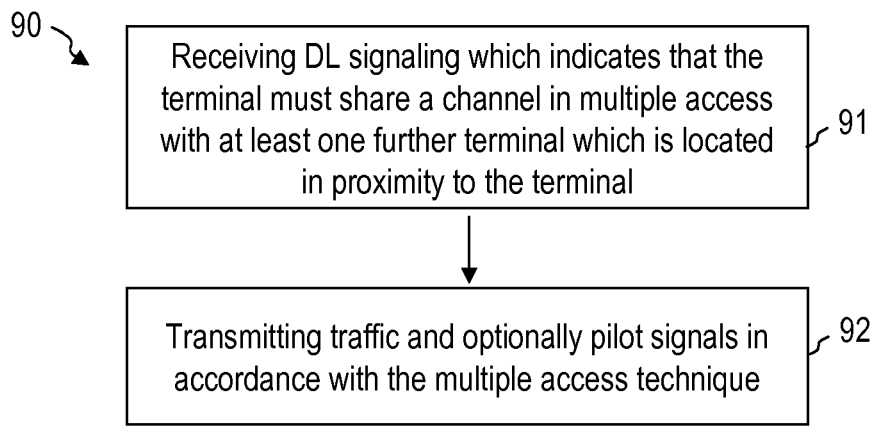
FIG. 9 is a flow chart of a method performed by a terminal according to an embodiment.

FIG. 9 is a flow chart of a method 90 performed by a terminal according to an embodiment. The terminal may generally be configured to selectively start using a multiple access technique other than SDMA when it is located so close to at least one further terminal that the base station may not be able to distinguish the terminal and the at least one further terminal based on spatial diversity. The terminal may be configured to selectively stop using the multiple access technique other than SDMA when it is located sufficiently far from the at least one further terminal that the base station can reliably distinguish the terminal and the at least one further terminal based on spatial diversity.

At 91, the terminal may receive a downlink signaling from the base station. The downlink signaling may indicate that the terminal must share a common channel with at least one further terminal. The at least one further terminal may be located so close to the terminal that the base station is not able to distinguish the terminal and the at least one further terminal based on spatial diversity.

At 92, the terminal transmits data traffic and optionally pilot signals in accordance with the multiple access scheme. The terminal may thereby use a fraction of the bandwidth of the common channel which is allocated to it by the base station. The terminal may receive data traffic and control signaling in accordance with the multiple access scheme.

Figure 10:
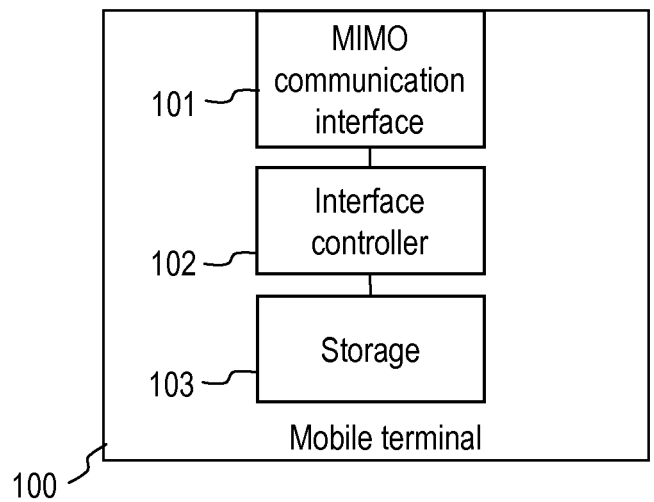
FIG. 10 is a block diagram of a terminal according to an embodiment.

FIG. 10 is a schematic block diagram of a terminal 100 according to an embodiment, which may be a mobile phone. The terminal 100 has an interface 101 configured for communication with a massive MIMO base station 20. The interface 101 has at least one antenna and may also include several antennas.

The terminal 100 has an interface controller 102. The interface controller 102 may include one or several processors, for example. The interface controller 102 may be configured to control the interface 101 to transmit signals and/or to process received signals. When the terminal 100 is positioned close to at least one further terminal and the base station may not be able to distinguish the terminal and the at least one further terminal based on spatial diversity, the interface controller 102 may control the transmission of uplink radio signals and the processing of downlink radio signals in accordance with a multiple access technique. The multiple access technique is used selectively only when the terminal and at least one further terminal are located so close to each other that the base station cannot reliably distinguish the terminal and the at least one further terminal in accordance with spatial diversity. The interface controller 102 controls the interface 101 to perform the multiple access technique such that the terminal and the at least one further terminal share a common channel, e.g. by using allocated frames in an alternative fashion in TDMA or by using different frequency sub-bands in FDMA.

The interface controller 102 may detect a condition in which the terminal and the at least one further terminal are located so close that the TDMA, FDMA or CDMA is to be performed when signaling received at the interface 101 indicates that the multiple access technique different from SDMA is to be used to share a common channel with at least one further terminal.

Alternatively or additionally, the interface controller 102 may be configured to detect a situation in which at least one further terminal is located in close proximity to the terminal 100. Device-to-device communication may be performed over the interface 101 to detect the at least one further terminal. The interface controller 102 may signal to the base station that the terminal 100 has detected at least one further terminal. The base station may device whether the terminal and the at least one further terminal can be distinguished based on space diversity. If not, the terminal 100 may be requested to share a common channel with the at least one further terminal using CDMA, FDMA, TDMA or another multiple access technique.

The terminal 100 may be configured to selectively stop using the multiple access technique when it is located sufficiently far from the at least one further terminal that the base station can reliably distinguish the terminal and the at least one further terminal based on spatial diversity. The interface controller 102 may control the interface 101 such that the terminal 100 does no longer share a common channel with at least one further terminal in this case. The interface controller 102 may be configured to process a multicast or dedicated signaling message received at the interface 101 from the base station to determine that it is no longer required to share the common channel with the at least one further terminal.

The terminal 100 has a storage unit 103, which may be implemented as a volatile or non-volatile memory. Parameters which define the resources which the terminal 100 is allowed to use when sharing a common channel with at least one further terminal may be stored temporarily or persistently in the storage unit 103.

It will be appreciated that methods and devices according to embodiments allow several terminals to share a common channel. The common channel may be a traffic channel. The embodiments may allow the base station to ensure that the several terminals which create a similar or the same spatial footprint at the plurality of antennas of the base station can be reliably distinguished.

In any one of the embodiments described herein, the base station may be a MIMO base station. The plurality of antennas of the base station may be a massive MIMO antenna array.

While embodiments have been described with reference to the drawings, modifications and alterations may be implemented in other embodiments.

For illustration, while a comparison of spatial footprints of pilot signals or other signals and/or a change in error rates may be used as indicators by the base station to determine whether spatial diversity may not allow several terminals to be distinguished, other indicators may be used. For illustration, ProSe enabled terminals may also signal to the base station that they are located so close to each other that a multiple access technique other than SDMA should be activated for data traffic and, optionally, pilot signaling.

While embodiments may selectively activate TDMA, CDMA or FDMA for terminals which are located close to each other and for which spatial diversity may not provide sufficient interference reduction, other multiple access techniques may be used.

Embodiments of the invention may be used in massive MIMO systems, without being limited thereto.

What is claimed is:

1. A method of controlling a signal transmission in a cellular multiple-input and multiple-output (MIMO) system, the cellular MIMO system comprising a base station having a plurality of antennas, the method comprising:
    monitoring, by the base station, at least one indicator to determine whether a spatial resolution of the plurality of antennas allows signals received from at least two terminals to be distinguished; and
    selectively activating, by the base station, a multiple access transmission and reception other than spatial diversity for the at least two terminals in response to detecting time-correlated changes in indicators associated with a first terminal and a second terminal of the at least two terminals the multiple access transmission and reception other than spatial diversity causing the at least two terminals to share a common channel.

2. The method of claim 1,
    wherein monitoring the at least one indicator comprises determining
        a first spatial footprint of signals from a first terminal of the at least two terminals at the plurality of antennas and
        a second spatial footprint of signals from a second terminal of the at least two terminals at the plurality of antennas;
    wherein the multiple access transmission and reception other than spatial diversity is selectively activated if the first spatial footprint and the second spatial footprint show that the spatial resolution of the plurality of antennas does not allow signals received from the first terminal to be distinguished from signals received from the second terminal.

3. The method of claim 2,
    wherein monitoring the at least one indicator comprises:
        determining a correlation of the first spatial footprint and the second spatial footprint.

4. The method of claim 2,
    wherein monitoring the at least one indicator comprises:
        monitoring a first error rate for the first terminal and/or a second error rate for the second terminal.

5. The method of claim 1,
wherein monitoring the at least one indicator comprises: monitoring an error rate for at least one terminal of the at least two terminals.

6. The method of claim 5,
wherein monitoring the at least one indicator comprises: monitoring a first error rate for a first terminal of the at least two terminals and monitoring a second error rate for a second terminal of the at least two terminals,
wherein the multiple access transmission and reception other than spatial diversity is selectively activated if both the first error rate and the second error rate exhibit a concurrent time-dependent increase.

7. The method of claim 1,
wherein the multiple access transmission and reception other than spatial diversity is a code division multiple access or a frequency division multiple access.

8. The method of claim 1,
wherein the multiple access transmission and reception other than spatial diversity is a time division multiple access.

9. The method of claim 1,
wherein the base station allocates different data bandwidths to a first terminal of the at least two terminals and to a second terminal of the at least two terminals which share the common channel.

10. The method of claim 1,
wherein the base station allocates different bandwidths to uplink signal transmissions and downlink signal transmissions of a terminal of the at least two terminals which share the common channel.

11. The method of claim 1, further comprising:
selectively deactivating, by the base station, the multiple access transmission and reception other than spatial diversity for the at least two terminals when the at least two terminals are located relative to the base station such that the spatial resolution of the plurality of antennas allows signals received from the at least two terminals to be distinguished.

12. The method of claim 1,
wherein the base station extrapolates a time-dependent change of the at least one indicator to determine whether the multiple access transmission and reception other than spatial diversity is to be activated.

13. A base station for a cellular multiple-input and multiple-output (MIMO) system, the base station comprising:
a plurality of antennas; and
a logic coupled to the plurality of antennas and configured to
monitor at least one indicator to determine whether a spatial resolution of the plurality of antennas allows signals received from at least two terminals to be distinguished; and
selectively activate a multiple access transmission and reception other than spatial diversity for the at least two terminals in response to detecting time-correlated changes in indicators associated with a first terminal and a second terminal of the at least two terminals, the multiple access transmission and reception other than spatial diversity causing the at least two terminals to share a common channel.

14. The base station of claim 13,
the logic being configured to determine
a first spatial footprint of signals from a first terminal of the at least two terminals at the plurality of antennas and
a second spatial footprint of signals from a second terminal of the at least two terminals at the plurality of antennas;
the logic being configured to selectively activate the multiple access transmission and reception other than spatial diversity if the first spatial footprint and the second spatial footprint show that the first terminal and the second terminal are located in proximity to each other.

15. The base station of claim 14,
the logic being configured to determine a correlation of the first spatial footprint and the second spatial footprint.

16. The base station of claim 13,
the logic being configured to monitor a first error rate for signals from a first terminal and a second error rate for signals from a second terminal.

17. The base station of claim 16,
the logic being configured to selectively activate the multiple access transmission and reception if both the first error rate and the second error rate exhibit a time-dependent increase.

18. The base station of claim 13,
the logic being configured to select the multiple access transmission and reception other than spatial diversity to be one of:
a code division multiple access;
a frequency division multiple access; or
a time division multiple access.

19. The base station of claim 13,
the logic being configured to selectively deactivate the multiple access transmission and reception other than spatial diversity for the at least two terminals when the spatial resolution of the plurality of antennas allows signals received from the at least two terminals to be distinguished.

20. A cellular multiple-input and multiple-output (MIMO) system, comprising:
a plurality of terminals; and
a base station comprising:
a plurality of antennas; and
a logic coupled to the plurality of antennas and configured to
monitor at least one indicator to determine whether a spatial resolution of the plurality of antennas allows signals received from at least two terminals of the plurality of terminals to be distinguished; and
selectively activate a multiple access transmission and reception other than spatial diversity for the at least two terminals in response to detecting time-correlated changes in indicators associated with a first terminal and a second terminal of the at least two terminals, the multiple access transmission and reception other than spatial diversity causing the at least two terminals to share a common channel.

* * * * *